US012651939B2

(12) United States Patent
Chen

(10) Patent No.: US 12,651,939 B2
(45) Date of Patent: Jun. 9, 2026

(54) MOTOR HOUSING STRUCTURE FOR CEILING FAN

(71) Applicant: AIR COOL INDUSTRIAL CO., LTD., Taichung (TW)

(72) Inventor: Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 218 days.

(21) Appl. No.: 18/670,741

(22) Filed: May 22, 2024

(65) Prior Publication Data

US 2025/0364862 A1 Nov. 27, 2025

(51) Int. Cl.
H02K 5/10 (2006.01)
H02K 5/16 (2006.01)
H02K 7/14 (2006.01)

(52) U.S. Cl.
CPC .............. H02K 5/10 (2013.01); H02K 5/161 (2013.01); H02K 7/14 (2013.01)

(58) Field of Classification Search
CPC ............ H02K 5/10; H02K 5/161; H02K 5/16; H02K 5/26; H02K 5/00; H02K 5/04
USPC ................................. 310/91, 89, 88, 62, 64
See application file for complete search history.

(56) References Cited

U.S. PATENT DOCUMENTS

| | | | | |
|---|---|---|---|---|
| 3,519,858 A | * | 7/1970 | Morganson | B23B 45/02 310/47 |
| 4,391,570 A | * | 7/1983 | Stutzman | F04D 29/5806 417/353 |
| 4,505,031 A | * | 3/1985 | Colwell | H02K 15/16 29/596 |
| 4,692,096 A | * | 9/1987 | Yang | F04D 25/0646 416/170 R |
| 4,897,571 A | * | 1/1990 | Isozumi | H02K 5/15 310/239 |
| 5,069,601 A | * | 12/1991 | Shawcross | F04D 25/088 416/204 R |
| 5,200,658 A | * | 4/1993 | Kohno | H02K 1/17 310/91 |
| 5,742,108 A | * | 4/1998 | Kuribayashi | H02K 5/207 126/307 R |
| 5,760,513 A | * | 6/1998 | Morishita | H02K 5/00 310/91 |
| 5,861,694 A | * | 1/1999 | Niemela | H02K 7/145 310/154.01 |
| 5,883,449 A | * | 3/1999 | Mehta | F04D 25/082 310/58 |

(Continued)

*Primary Examiner* — Maged M Almawri
(74) *Attorney, Agent, or Firm* — Che-Yang Chen

(57) ABSTRACT

A motor housing structure for a ceiling fan includes an upper housing and a lower housing. An internal space is defined in the upper housing and the lower housing. The upper housing has an upper circumferential wall formed with a plurality of lugs. The lower housing has a holding portion and at least one blocking portion. The holding portion vertically supports the at least one upper circumferential wall of the upper housing and blocks external air and dust from entering the internal space via the upper opening. The at least one blocking portion blocks external air and dust from entering the internal space via notches of the upper circumferential wall. A plurality of locking members are inserted in the lugs of the upper housing and locked to the lower housing, thereby enhancing the stability, supporting capacity and safety of the motor housing structure.

10 Claims, 7 Drawing Sheets

(56) References Cited

U.S. PATENT DOCUMENTS

| | | | | |
|---|---|---|---|---|
| 5,900,686 A * | 5/1999 | Tabata | B62M 7/12 | 310/68 B |
| 5,932,942 A * | 8/1999 | Patyk | H02K 11/33 | 310/58 |
| 5,952,751 A * | 9/1999 | Yamakoshi | H02K 5/10 | 310/88 |
| 6,400,051 B1 * | 6/2002 | Hsieh | H02K 5/15 | 310/67 R |
| 6,589,018 B2 * | 7/2003 | Chen | F04D 29/263 | 310/71 |
| 6,740,992 B2 * | 5/2004 | Nadeau | F16F 15/067 | 310/91 |
| 6,844,641 B1 * | 1/2005 | Horng | F04D 29/526 | 310/89 |
| 9,385,572 B2 * | 7/2016 | Lu | H02K 7/003 | |
| 10,173,715 B2 * | 1/2019 | Hayashi | B62D 5/04 | |
| 10,177,632 B2 * | 1/2019 | Miyajima | H02K 11/215 | |
| 10,641,291 B2 * | 5/2020 | Jones | H01R 13/6278 | |
| 10,848,042 B2 * | 11/2020 | Beyerl | H02K 23/023 | |
| 11,190,080 B2 * | 11/2021 | Lin | F04D 25/088 | |
| 2002/0050759 A1 * | 5/2002 | Shiraki | H02K 5/145 | 310/239 |
| 2004/0183386 A1 * | 9/2004 | Kuwert | H02K 5/225 | 310/71 |
| 2006/0175906 A1 * | 8/2006 | Hino | G09B 23/18 | 310/1 |
| 2006/0238059 A1 * | 10/2006 | Komatsu | H02K 29/08 | 310/318 |
| 2008/0203837 A1 * | 8/2008 | Tang | H02K 1/2791 | 310/156.38 |
| 2009/0015111 A1 * | 1/2009 | Chen | H02K 11/22 | 310/68 B |
| 2013/0076213 A1 * | 3/2013 | McCloud | H02K 5/00 | 310/75 D |
| 2013/0209293 A1 * | 8/2013 | Kawano | F04D 25/06 | 310/90 |
| 2014/0119925 A1 * | 5/2014 | Wang | F04D 25/088 | 416/204 R |
| 2014/0284183 A1 * | 9/2014 | Wolters | B65G 39/09 | 198/788 |
| 2015/0207379 A1 * | 7/2015 | Muller | H02K 5/22 | 310/43 |
| 2016/0021765 A1 * | 1/2016 | Yu | H02K 5/203 | 361/759 |
| 2016/0218596 A1 * | 7/2016 | Hayashi | H02K 11/33 | |
| 2017/0141639 A1 * | 5/2017 | Yao | F04D 25/088 | |
| 2017/0175774 A1 * | 6/2017 | Yang | F04D 25/088 | |
| 2017/0296020 A1 * | 10/2017 | Chen | H02K 1/278 | |
| 2017/0366054 A1 * | 12/2017 | Li | H02K 23/04 | |
| 2018/0023580 A1 * | 1/2018 | Ishizaki | H02K 5/207 | 417/368 |
| 2019/0028005 A1 * | 1/2019 | Ishizaki | H02K 1/2791 | |
| 2019/0131751 A1 * | 5/2019 | McCurry | H02K 5/225 | |
| 2020/0119616 A1 * | 4/2020 | Ludwig | H02K 11/014 | |
| 2021/0099048 A1 * | 4/2021 | Lin | H02K 5/26 | |

* cited by examiner

26

MOTOR HOUSING STRUCTURE FOR CEILING FAN

FIELD OF THE INVENTION

The present invention relates to a motor housing structure, and more particularly, to a motor housing structure for a ceiling fan.

BACKGROUND OF THE INVENTION

As shown in FIG. 1, a conventional ceiling fan includes a motor unit 1. The motor unit 1 has a housing 2. The housing 2 includes a first housing 3 located at the top and a second housing 4 located at the bottom. One end of the circumferential wall of the first housing 3, facing the second housing 4, has a first flange 5 extending outward. The first flange 5 has a plurality of vertical through holes 6. The first flange 5 of the first housing 3 is locked to the second housing 4 through a plurality of fixing members 7. The housing 2 is a rotor. The second housing 4 is configured for connecting a blade unit 8.

When the blade unit 8 is fixed to the second housing 4, the weight of the blade unit 8 affects the motor unit 1. Because the first housing 3 and the first flange 5 are made of thin plates and the first flange 5 extends transversely, the first housing 3 and the first flange 5 cannot vertically support the second housing 4 very well. After a period of time, the structure may be instable and deformed to affect the operation of the blade unit 8. Accordingly, the inventor of the present invention has devoted himself based on his many years of practical experiences to solve these problems.

SUMMARY OF THE INVENTION

The primary object of the present invention is to provide a motor housing structure for a ceiling fan, which can block external air and dust from entering into the internal space of the motor housing and enhance the stability, supporting capacity and safety of the motor housing structure.

In order to achieve the foregoing object, the motor housing structure provided by the present invention comprises an upper housing and a lower housing. The upper housing and the lower housing are fixedly connected together. An internal space is defined in the upper housing and the lower housing. A central axle passes through the upper housing and the lower housing. The upper housing has at least one upper circumferential wall. One end of the at least one upper circumferential wall, facing the lower housing, has an upper opening. An upper space is defined in the upper housing. The at least one upper circumferential wall has a plurality of transverse lugs that extend outwards and are disposed adjacent to the upper opening. The lugs are integrally formed with the upper housing and arranged at intervals. The lugs each have an open lug space. The at least one upper circumferential wall further has notches each located between the lug space and the upper space. The lug space communicates with the upper space via a corresponding one of the notches. When the upper housing is combined with the lower housing, the upper space is located in the internal space. The lower housing is located below the upper housing. The lower housing has a holding portion corresponding to the upper opening, the at least one upper circumferential wall and the lugs. When the upper housing is combined with the lower housing, the holding portion vertically supports the at least one upper circumferential wall and blocks external air and dust from entering the internal space via the upper opening. The lower housing further has at least one blocking portion corresponding to the upper opening, the at least one upper circumferential wall and the notches. When the upper housing is combined with the lower housing, the at least one blocking portion blocks external air and dust from entering the internal space via the notches. The holding portion of the lower housing has locking holes corresponding to the respective lugs. A plurality of locking members are inserted in the lug spaces of the lugs of the upper housing and locked to the locking holes of the lower housing for vertically supporting the lugs and the at least one upper circumferential wall.

The holding portion and the at least one blocking portion of the lower housing provide vertical and transverse support against the upper housing and block external air and dust from entering the interior space via the upper opening and the notches, thereby achieving the effect of improving the stability, supporting capacity and safety of the motor housing structure.

DETAILED DESCRIPTION OF THE PREFERRED EMBODIMENTS

Figure 1:
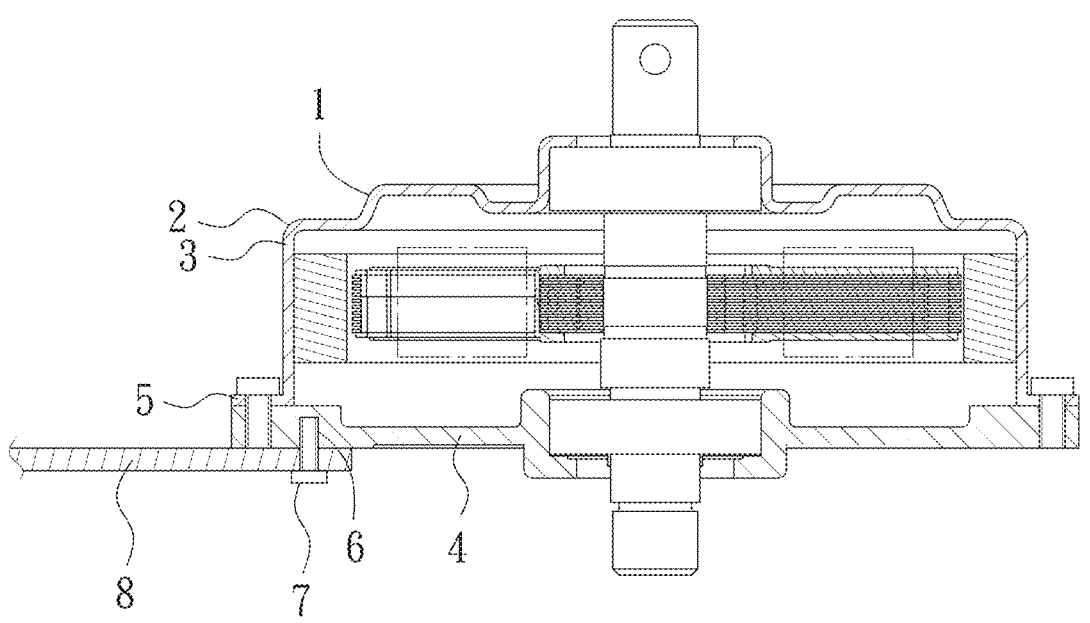
FIG. 1 is a cross-sectional view of a conventional motor.
Figure 2:
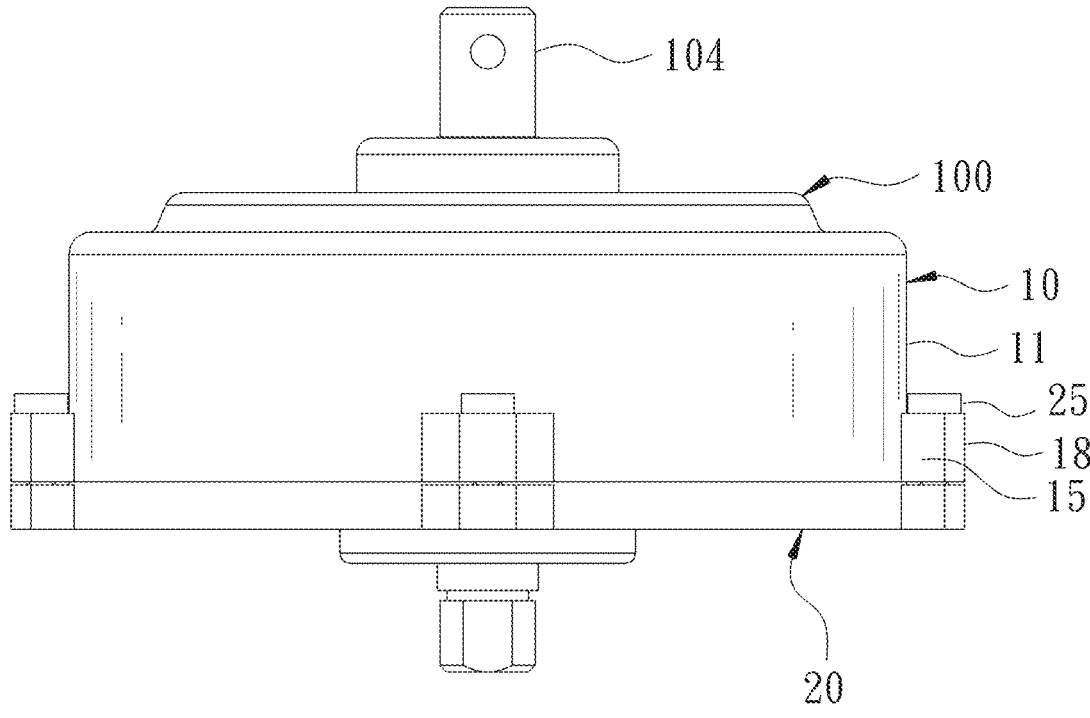
FIG. 2 is a side view according to a first embodiment of the present invention.
Figure 3:
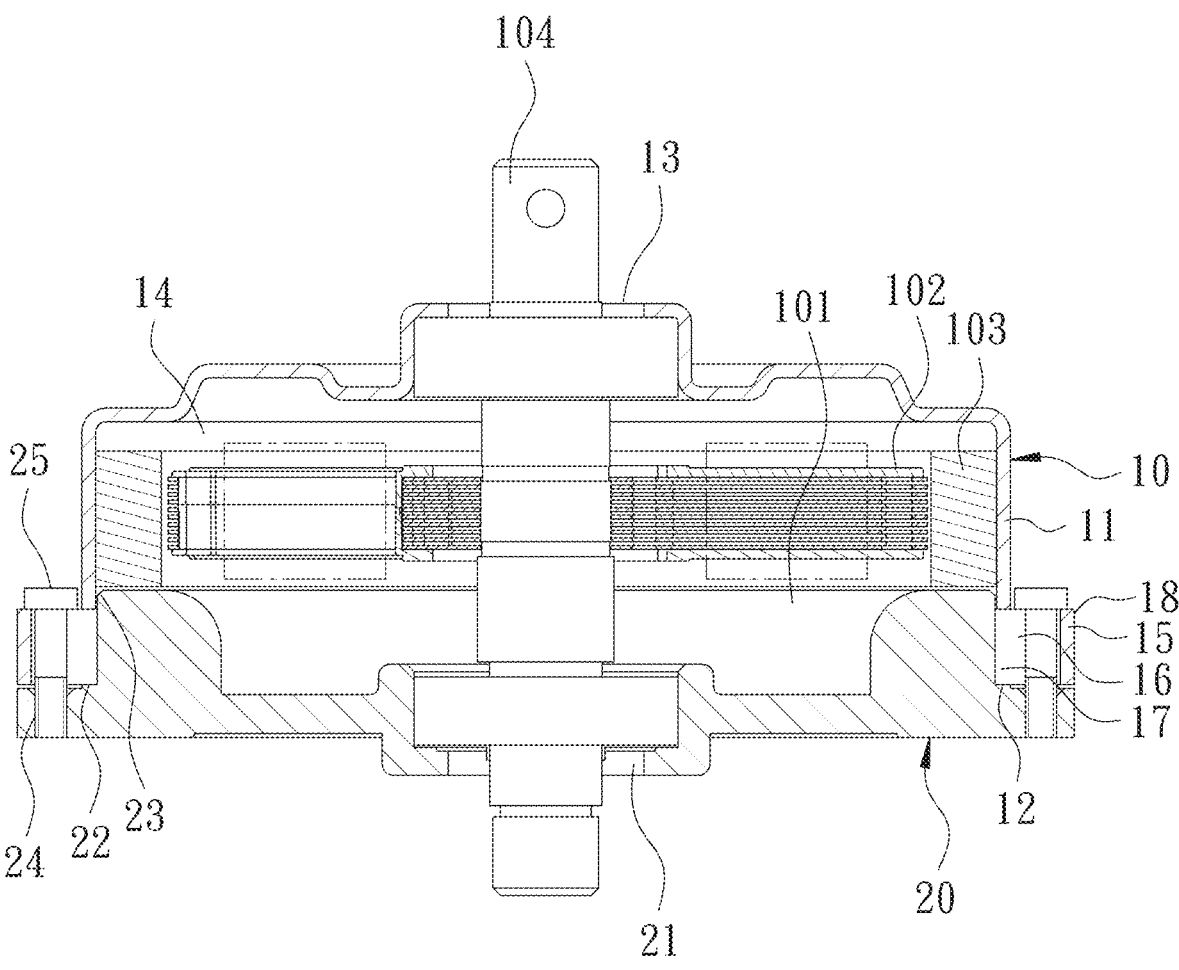
FIG. 3 is a cross-sectional view according to the first embodiment of the present invention.
Figure 4:
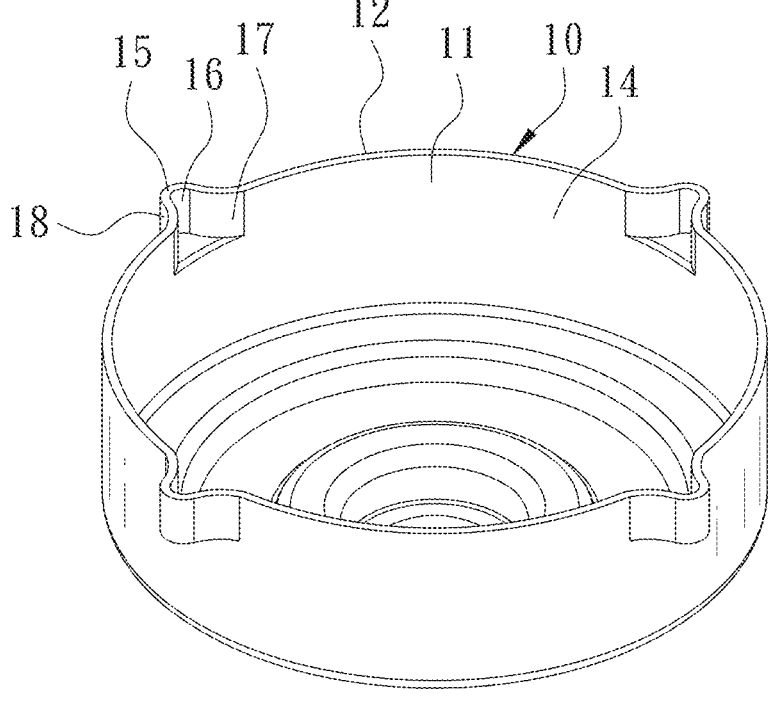
FIG. 4 is a perspective view of the upper housing according to the first embodiment of the present invention.
Figure 5:
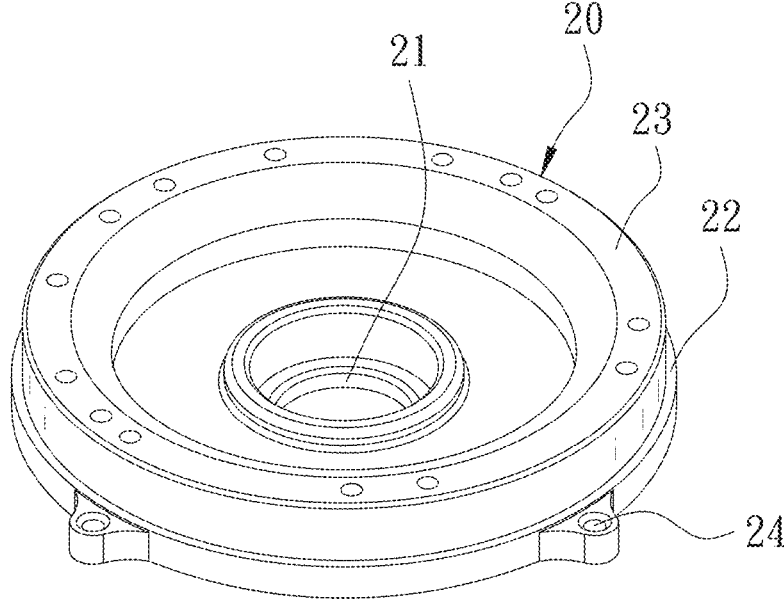
FIG. 5 is a perspective view of the lower housing according to the first embodiment of the present invention.
Figure 6:
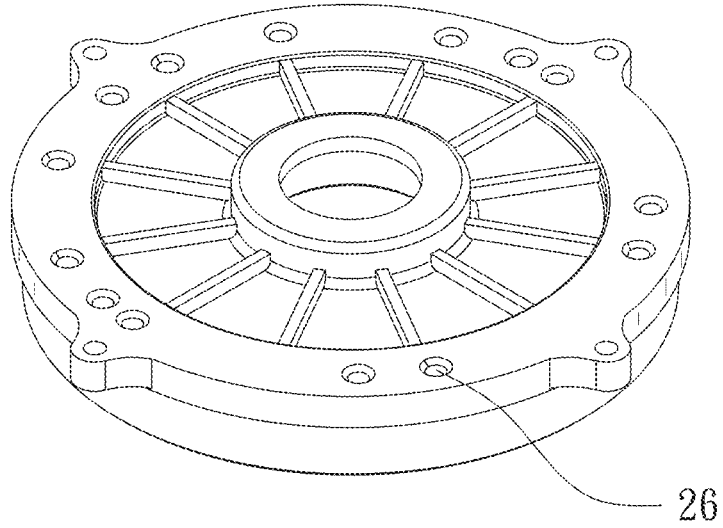
FIG. 6 is another perspective view of the lower housing according to the first embodiment of the present invention, showing the other side of the lower housing.

Embodiments of the present invention will now be described, by way of example only, with reference to the accompanying drawings.

FIG. 2 through FIG. 6 illustrate a first embodiment of the present invention. The present invention discloses a motor housing structure 100 for a ceiling fan, comprising an upper housing 10 and a lower housing 20. The upper housing 10 and the lower housing 20 are fixedly connected together. An internal space 101 is defined in the upper housing 10 and the lower housing 20. The internal space 101 of the motor housing structure 100 of the ceiling fan accommodates a stator 102 and a rotor 103. A central axle 104 passes through the upper housing 10 and the lower housing 20.

The upper housing 10 has at least one upper circumferential wall 11. One end of the at least one upper circumferential wall 11, facing the lower housing 20, has an upper opening 12. Another end of the at least one upper circumferential wall 11, facing away from the lower housing 20, has an upper hole 13. The upper housing 10 has the at least one upper circumferential wall 11 between the upper hole 13 and the upper opening 12. An upper space 14 is defined in the upper housing 10. The at least one upper circumferential wall 11 has a plurality of transverse lugs 15 that extend outwards and are disposed adjacent to the upper opening 12. The lugs 15 are integrally formed with the upper housing 10 and are arranged at intervals. The lugs 15 each have an open lug space 16. The at least one upper circumferential wall 11 further has notches 17 each located between the lug space 16 and the upper space 14. The lug space 16 communicates with the upper space 14 via the corresponding notch 17. When the upper housing 10 is combined with the lower housing 20, the upper space 14 is located in the internal space 101.

The lower housing 20 is located below the upper housing 10. The lower housing 20 has a lower hole 21. The upper hole 13 and the lower hole 21 are configured for insertion of the central axle 104. The lower housing 20 has a holding portion 22 corresponding to the upper opening 12, the at least one upper circumferential wall 11 and the lugs 15. When the upper housing 10 is combined with the lower housing 20, the holding portion 22 vertically supports the at least one upper circumferential wall 11 and blocks external air and dust from entering the internal space 101 via the upper opening 12. The lower housing 20 further has at least one blocking portion 23 corresponding to the upper opening 12, the at least one upper circumferential wall 11 and the notches 17. The at least one blocking portion 23 extends from the lower housing 20 toward the upper housing 10. The at least one blocking portion 23 is integrally formed with the lower housing 20. The at least one blocking portion 23 is adjacent to the inner side of the at least one upper circumferential wall 11 for transversely supporting the upper housing 10. When the upper housing 10 is combined with the lower housing 20, the at least one blocking portion 23 blocks external air and dust from entering the internal space 101 via the notches 17. The holding portion 22 of the lower housing 20 has locking holes 24 corresponding to the respective lugs 15. A plurality of locking members 25 are inserted in the lug spaces 16 of the lugs 15 of the upper housing 10 and locked to the locking holes 24 of the lower housing 20 to form a plurality of pillar support structures for vertically supporting the lugs 15 and the at least one upper circumferential wall 11. One end of the lower housing 20, facing away from the upper housing 10, has a plurality of screw holes 26 corresponding to the at least one blocking portion 23 for locking a blade bracket or blades (not shown in the drawings).

The vertical length of the lug 15 is not less than 2.5 to 4 mm. The vertical length of the locking hole 24 is not less than 2.5 to 4 mm. Compared with the technical feature of the thin plate of the conventional motor housing, the present invention further improves the structural strength and supporting effect of the upper housing 10 and the lower housing 20.

The outer side wall of the lug 15 is defined as an outer protruding wall 18. When the locking members 25 are locked, the locking members 25 are not beyond the outer protruding walls 18 of the respective lugs 15, so as to shield the locking members 25. The locking members 25 won't be seen when a person looks upwards, thereby increasing the visual aesthetics.

Figure 7:
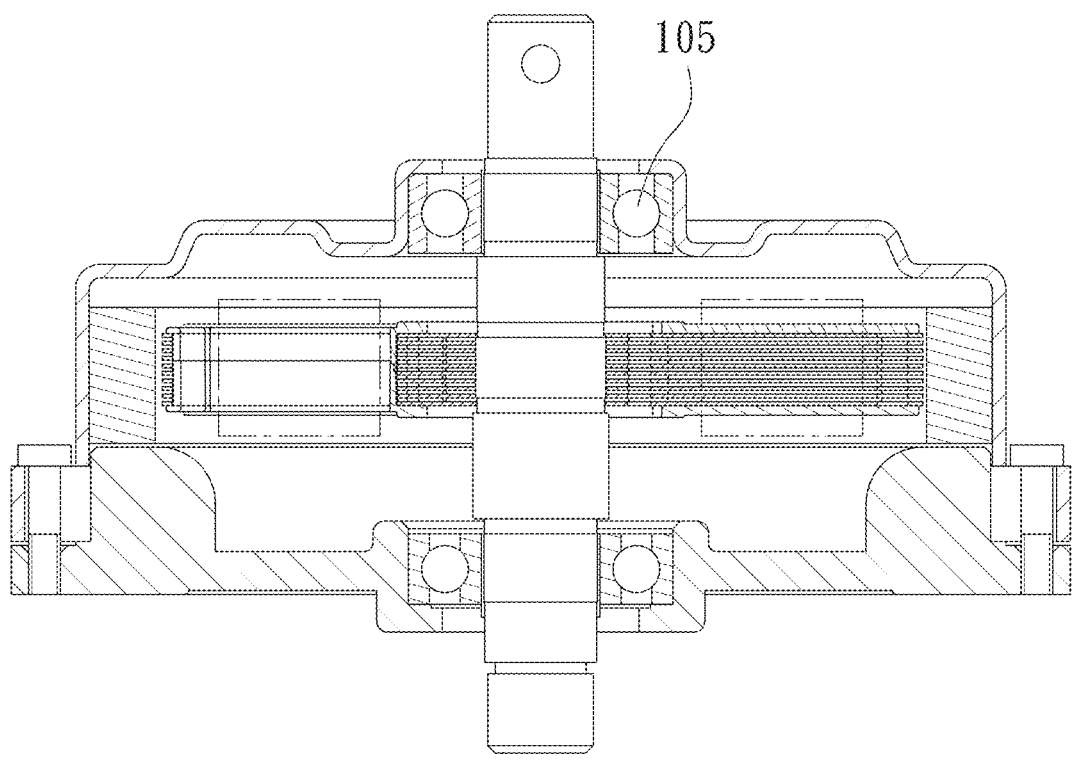
FIG. 7 is a cross-sectional view according to a second embodiment of the present invention.

FIG. 7 is a cross-sectional view according to a second embodiment of the present invention. In the second embodiment of the present invention, the upper housing 10 and the lower housing 20 are pivotally connected to the central axle 104. Each of the upper housing 10 and the lower housing 20 is pivotally connected to the central axle 104 through a bearing 105. One bearing 105 is disposed between the upper hole 13 of the upper housing 10 and the central axle 104, and another bearing 105 is disposed between the lower hole 21 of the lower housing 20 and the central axle 104, so as to block external air and dust from entering the internal space 101 via the upper hole 13 and the lower hole 21.

The holding portion 22 and the at least one blocking portion 23 of the lower housing 20 provide vertical and transverse support against the upper housing 10 and block external air and dust from entering the interior space 101 via the upper opening 12 and the notches 17, thereby achieving the effect of improving the stability, supporting capacity and safety of the motor housing structure.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A motor housing structure for a ceiling fan, comprising an upper housing and a lower housing, the upper housing and the lower housing being fixedly connected together, an internal space being defined in the upper housing and the lower housing, a central axle passing through the upper housing and the lower housing, characterized by:

the upper housing having at least one upper circumferential wall, one end of the at least one upper circumferential wall, facing the lower housing, having an upper opening, an upper space being defined in the upper housing, the at least one upper circumferential wall having a plurality of transverse lugs that extend outwards and are disposed adjacent to the upper opening, the lugs being integrally formed with the upper housing and arranged at intervals, the lugs each having an open lug space, the at least one upper circumferential wall further having notches each located between the lug space and the upper space, the lug space communicating with the upper space via a corresponding one of the notches, wherein when the upper housing is combined with the lower housing, the upper space is located in the internal space;

the lower housing being located below the upper housing, the lower housing having a holding portion corresponding to the upper opening, the at least one upper circumferential wall and the lugs, wherein when the upper housing is combined with the lower housing, the holding portion vertically supports the at least one upper circumferential wall and blocks external air and dust from entering the internal space via the upper opening, the lower housing further having at least one blocking portion corresponding to the upper opening, the at least one upper circumferential wall and the notches, wherein when the upper housing is combined with the lower housing, the at least one blocking portion blocks external air and dust from entering the internal space via the notches, the holding portion of the lower housing having locking holes corresponding to the respective lugs, a plurality of locking members being inserted in the lug spaces of the lugs of the upper housing and locked to the locking holes of the lower housing for vertically supporting the lugs and the at least one upper circumferential wall.

2. The motor housing structure as claimed in claim 1, wherein the upper housing and the lower housing are pivotally connected to the central axle.

3. The motor housing structure as claimed in claim 2, wherein another end of the at least one upper circumferential wall, facing away from the lower housing, has an upper hole, the upper housing has the at least one upper circumferential wall between the upper hole and the upper opening, the lower housing has a lower hole, the upper hole and the lower hole are configured for insertion of the central axle, and the upper housing and the lower housing are pivotally connected to the central axle through bearings, respectively.

4. The motor housing structure as claimed in claim 3, wherein one of the bearings is disposed between the upper hole of the upper housing and the central axle, and the other one of bearings is disposed between the lower hole of the lower housing and the central axle, so as to block external air and dust from entering the internal space via the upper hole and the lower hole.

5. The motor housing structure as claimed in claim 3, wherein the at least one blocking portion extends from the lower housing toward the upper housing, and the at least one blocking portion is integrally formed with the lower housing.

6. The motor housing structure as claimed in claim 4, wherein the at least one blocking portion is adjacent to an inner side of the at least one upper circumferential wall for transversely supporting the upper housing.

7. The motor housing structure as claimed in claim 4, wherein one end of the lower housing, facing away from the upper housing, has a plurality of screw holes corresponding to the at least one blocking portion for locking a blade bracket or blades.

8. The motor housing structure as claimed in claim 5, wherein a stator and a rotor are provided in the internal space, the lugs each have an outer protruding wall, when the locking members are locked, the locking members are not beyond the outer protruding walls of the respective lugs.

9. The motor housing structure as claimed in claim 5, wherein the lugs each have a vertical length of not less than 2.5 mm, and the locking holes each have a vertical length of not less than 2.5 mm.

10. The motor housing structure as claimed in claim 5, wherein the lugs each have a vertical length of not less than 4 mm, and the locking holes each have a vertical length of not less than 4 mm.

* * * * *